(No Model.)
C. V. ZINN.
CAN OPENER.
No. 556,395. Patented Mar. 17, 1896.
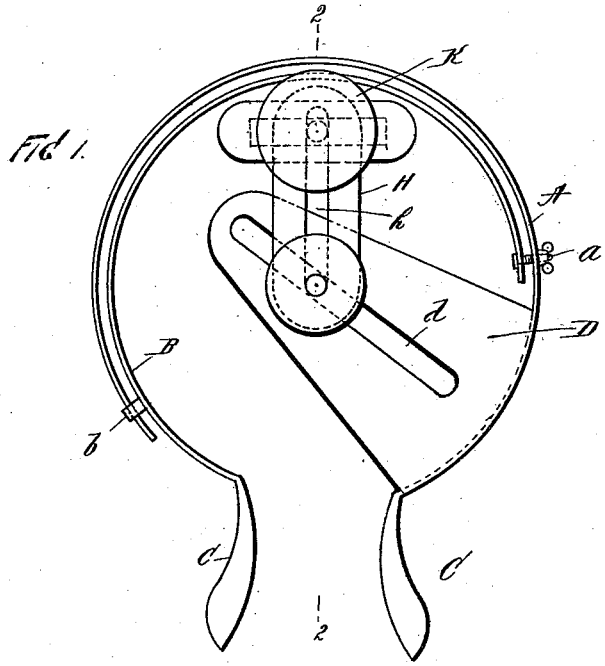
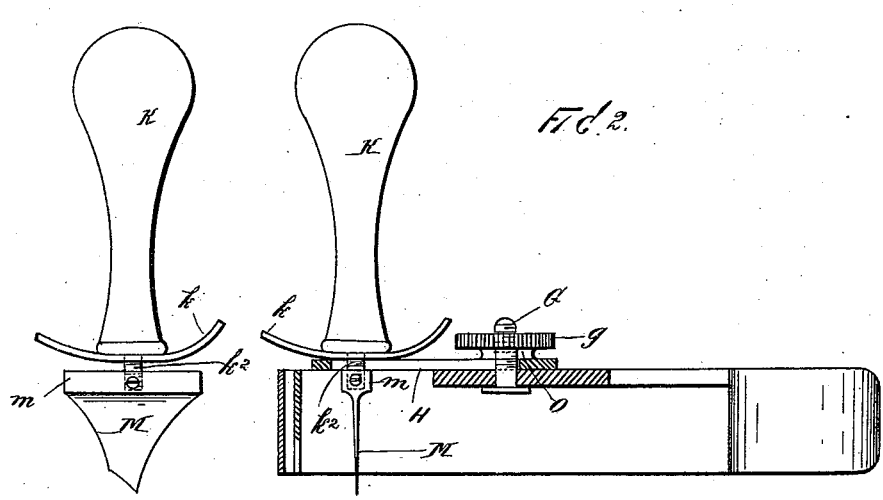
WITNESSES:
John Buckler
C. Gersh
INVENTOR
Claude V. Zinn
BY Edgar Tate & Co
ATTORNEYS.

UNITED STATES PATENT OFFICE.

CLAUDE VERNON ZINN, OF OGDEN, UTAH.

CAN-OPENER.

SPECIFICATION forming part of Letters Patent No. 556,395, dated March 17, 1896.

Application filed December 24, 1895. Serial No. 573,221. (No model.)

*To all whom it may concern:*

Be it known that I, CLAUDE VERNON ZINN, a citizen of the United States, and a resident of Ogden, in the county of Weber, Utah Territory, have invented certain new and useful Improvements in Can-Openers, of which the following is a specification, reference being had to the accompanying drawings, forming a part thereof, in which similar letters of reference indicate corresponding parts.

This invention relates to devices for opening cans, and the object thereof is to provide an effective device of this class which is simple in construction and operation and comparatively inexpensive.

The invention is fully disclosed in the following specification, of which the accompanying drawings form a part, in which—

Figure 1 is a plan view of my improved can-opener; Fig. 2, a transverse section thereof on the line 2 2; and Fig. 3, a view of the knife or cutter, including the handle and the blade thereof, detached.

In the practice of my invention I provide two similar circular bands A and B, one of which is placed within the other, as shown in Fig. 1; and in the arrangement shown the band B is placed within the band A, and one end of the band B is provided with a keeper $b$, through which the opposite end of the band A is adapted to be passed, and passing through the band A opposite the keeper $b$ is a set-screw $a$, the inner end of which is connected with the band B, and by means of this arrangement these bands may be adjusted one upon the other, and the size of the circle formed thereby limited or regulated, as will be readily understood.

The outer ends of each of the bands A and B are provided with a handle C, and secured to the upper side of the outer band A adjacent to the handle C thereof is a radial plate D, which projects inwardly and beyond the center of the circle formed by said bands, and the said radial plate is provided with a longitudinal slot $d$, and mounted in said longitudinal slot $d$ is a screw-threaded bolt G, provided with a thumb nut $g$, and mounted on said bolt above the radial plate D is an arm H provided with a longitudinal slot $h$ and connected with the arm H by means of said slot.

$h$ is a knife or cutter proper, which consists of a handle K, at the lower end of which is a segmental guard-plate $k$, and secured to the handle K is a shank $k^2$, which is adapted to pass through the slot $h$ in the arm H, and secured to the lower end of the shank $k^2$ is a cutting-blade M, which is provided with a cross-head $m$, and the form of the blade M is preferably that shown in Fig. 3, said blade being inclined on both sides and provided with a sharp point, and said blade being also preferably provided with a cutting-edge on both sides.

The operation will be readily understood from the foregoing description, when taken in connection with the accompanying drawings, and in view of the following statement thereof. The bands A and B are adjusted so that the circle formed thereby will be large enough to inclose the end of the can, the head of which is to be removed, so that the handles formed on the outer ends thereof will come sufficiently close together to be grasped by one hand, and said handles are then grasped with the thumb and fingers of the left hand and the can tightly held thereby. The knife-holder is then adjusted so that the screw-threaded bolt G and the thumb-nut $g$ will come over the center of the can, and the knife-handle is then adjusted so that the blade will come as close to the outer edge of the can as desired. The point of the blade is then pressed through the head of the can at the point farthest from the operator or nearest the point on the handles where the handles on the bands A and B meet, and the knife is then brought forward by a single movement or a series of movements as desired, and in this manner the entire head may be quickly cut out; and, as will be understood, the exact method of operation above specified need not necessarily be followed, as any preferred process may be adopted. By relaxing the grasp on the handles of the bands A and B, the same will loosen and said bands may again be adjusted to any desired position, as will be readily understood. I also prefer to employ a small rubber washer O to guard against the movement of careless operators, who by chance might bring too much strain on the parts of the holder and by means of which said parts are permitted to yield slightly.

It is evident that changes in and modifications of the construction herein described may be made without departing from the spirit of my invention or sacrificing its advantages, and I therefore reserve the right to make all such alterations therein and modifications thereof as fairly come within the scope of the invention.

Having fully described my invention, I claim as new and desire to secure by Letters Patent—

1. The can-opener herein described, composed of two adjustable bands one of which is mounted within the other, and the outer ends of which are each provided with a handle, a radial cross-plate secured to the upper side of one of said bands, and provided with a longitudinal slot, a bolt passing through said slot, an arm connected with said bolt and provided with a longitudinal slot through which said bolt passes, and a knife or cutter comprising a handle, a shank which passes through the slot in said arm and a cutting-blade secured to the lower side of said shank, substantially as shown and described.

2. The can-opener herein described, composed of two adjustable bands one of which is mounted within the other, and the outer ends of which are each provided with a handle, a radial cross-plate secured to the upper side of one of said bands, and provided with a longitudinal slot, a bolt passing through said slot, an arm connected with said bolt and provided with a longitudinal slot through which said bolt passes, and a knife or cutter comprising a handle, a shank which passes through the slot in said arm and a cutting-blade secured to the lower side of said shank, and said knife or cutter being also provided at the lower end of the handle with a guard-plate, substantially as shown and described.

3. A can-opener comprising two adjustable bands, which are adapted to inclose the end of a can, a radial plate secured to one of said bands, and extending inwardly, and a longitudinally-adjustable bolt passing through said plate, an arm connected with said bolt and provided with a longitudinal slot, and a cutter comprising a handle and a blade connected therewith, said handle being provided with a shank which passes through the slot in said arm and to the lower end of which the blade is secured, substantially as shown and described.

In testimony that I claim the foregoing as my invention I have signed my name, in presence of the subscribing witnesses, this 16th day of December, 1895.

CLAUDE VERNON ZINN.

Witnesses:
SANFORD L. IVES,
N. H. IVES.